Oct. 21, 1958 A. KAUFMANN 2,856,763
KNITTING MACHINE FOR HOME USE AND FOR SMALL PRODUCTION
Filed April 28, 1953 10 Sheets-Sheet 1

INVENTOR
ARTHUR KAUFMANN
BY
ATTY.

Oct. 21, 1958 A. KAUFMANN 2,856,763
KNITTING MACHINE FOR HOME USE AND FOR SMALL PRODUCTION
Filed April 28, 1953 10 Sheets-Sheet 3

Fig.3

INVENTOR
ARTHUR KAUFMANN
BY
ATTY.

Oct. 21, 1958  A. KAUFMANN  2,856,763
KNITTING MACHINE FOR HOME USE AND FOR SMALL PRODUCTION
Filed April 28, 1953  10 Sheets-Sheet 5

INVENTOR
ARTHUR KAUFMANN
BY
ATTY.

Oct. 21, 1958 A. KAUFMANN 2,856,763
KNITTING MACHINE FOR HOME USE AND FOR SMALL PRODUCTION
Filed April 28, 1953 10 Sheets-Sheet 7

INVENTOR
ARTHUR KAUFMANN
BY
ATTY.

INVENTOR
ARTHUR KAUFMANN

Oct. 21, 1958  A. KAUFMANN  2,856,763
KNITTING MACHINE FOR HOME USE AND FOR SMALL PRODUCTION
Filed April 28, 1953  10 Sheets-Sheet 9

INVENTOR
ARTHUR KAUFMANN
BY
ATTY.

United States Patent Office 2,856,763
Patented Oct. 21, 1958

2,856,763
KNITTING MACHINE FOR HOME USE AND FOR SMALL PRODUCTION

Arthur Kaufmann, Paris, France

Application April 28, 1953, Serial No. 351,598

Claims priority, application France May 10, 1952

10 Claims. (Cl. 66—63)

This invention relates to knitting machines and more particularly to such machines especially adapted for use in the home and for other simple production programs.

Knitting machines that are presently in use in the home are generally similar to industrial machines, but are of a smaller scale. The main drawbacks of such machines are their relatively complicated mechanisms, their difficulty to operate and their cost, which have prevented their widespread acceptance and use.

It is a principal object of the present invention, therefore, to provide a knitting machine having simplicity of design, economy of construction, ease and efficiency in operation and one which is readily adapted for use in the home.

In accordance with this objective, the knitting machine embodying the present invention features a pair of needlebeds that are spaced a slight distance from each other, the beds being mounted on a chassis which can be rapidly fastened on the edge of a table. Needles placed in grooves provided in each needlebed are driven in a rectilinear, reciprocating motion by cams which are secured to a carriage that slides longitudinally relative to the needlebeds. The cams are of V formation so that the required needle motion for forming the loops of the knitted work is provided by the movement of the cams in relation to the needlebeds. The spacing between the needlebeds may be varied, and the V cams may be moved with relation to each other to permit the knitting of loose or tight loops.

Another feature of the invention contributing to the described objective lies in the provision of two additional small cams on the sliding carriage which are adjustable in height. Adjustment of these cams permit the use of one needlebed when in raised position and the use of both needlebeds when they are lowered. When the adjustable cams are raised, the knitting embodies a plain stitch, and when lowered, permits of knitting of the garter stitch.

The novel features that are considered characteristic of the invention are set forth with particularity in the appended claims. The invention itself, however, both as to its organization and its method of operation, together with additional objects and advantages thereof, will best be understood from the following description of a specific embodiment when read in connection with the accompanying drawings, wherein like reference characters indicate like parts throughout the several figures and in which:

Figure 1:
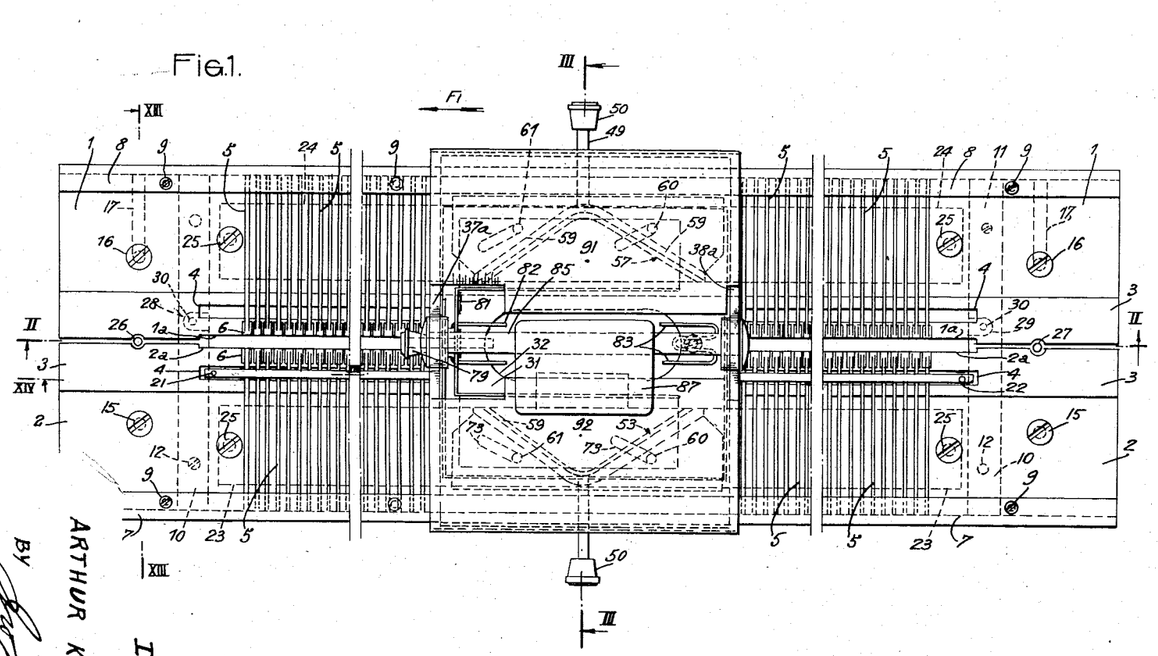
Figure 1 is a plan view of a knitting machine constructed in accordance with the invention.

Referring to the drawings and more particularly to Fig. 1, the knitting machine includes a plate formed by two spaced needlebeds 1 and 2, preferably of plastic material, each of which includes a thickened portion 3 in which is provided a longitudinal groove 4, and aligned transverse grooves 5 and 6 that together extend the entire width of the needlebed for certain portions thereof. The longitudinal space between the needlebeds 1 and 2 provides a work opening. The grooves 6 extend between the longitudinal groove 4 and the inner edges 1a—2a of the needlebeds. The grooves 5 extend between groove 4 and the outer edges of the needlebeds 1 and 2. The bottoms of grooves 5 and 6 are equidistant from the lower faces of the needlebeds 1 and 2. A pair of rails 7 and 8 are secured by means of screws 9 to the outer longitudinal edges respectively of each of the needlebeds 1 and 2.

Figure 2:
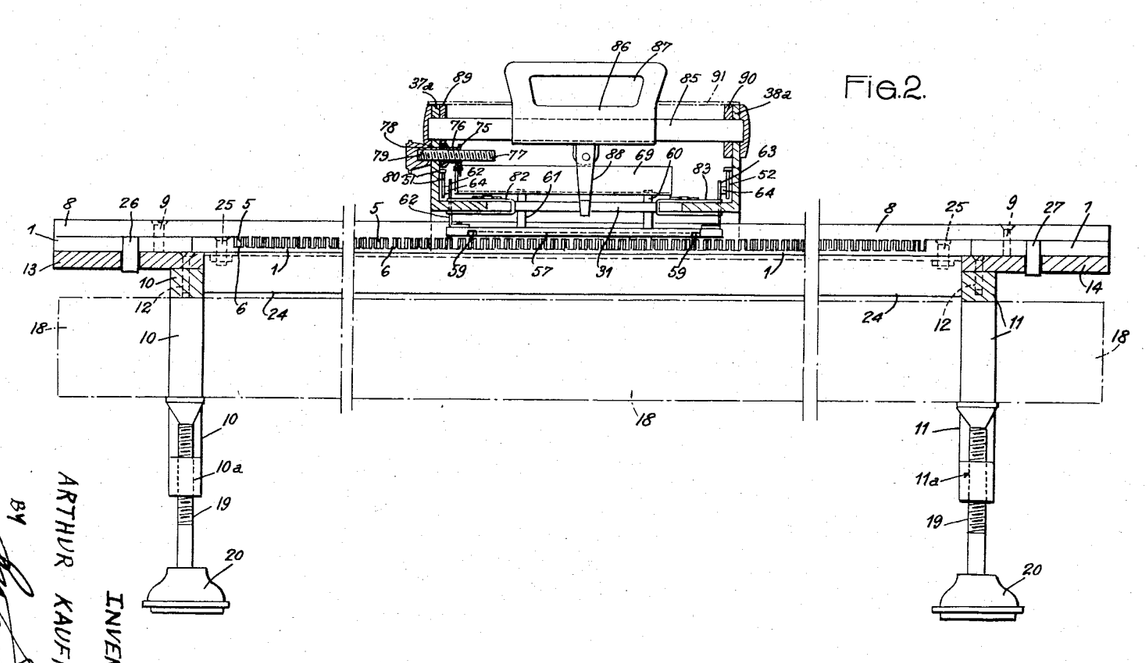
Figure 2 is a section taken on line II—II of Figure 1.
Figure 13:
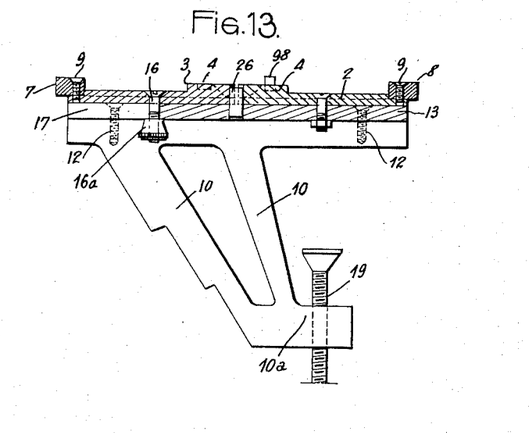
Figure 13 is a section taken on line XIII—XIII of Figure 1.
Figure 14:
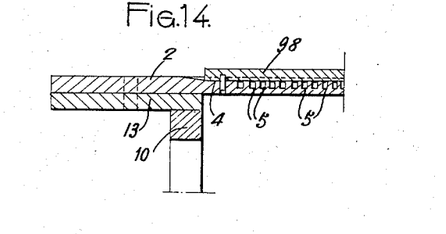
Figure 14 is a partial section taken on line XIV—XIV of Figure 1 showing only one end of the machine.

The frame of the knitting machine comprises vertical supports 10 and 11 on which are secured crosspieces 13 and 14, Fig. 2, by means of screws 12. The needlebeds 1 and 2 are mounted on these crosspieces, the needlebed 2 being secured to the crosspieces 13 and 14 by bolts and nuts 15. Screw rods 16, Fig. 13, on the needlebed 1 engage notches 17 in the crosspieces 13 and 14 and clamping nuts 16a are threaded onto the screw rods 16. Release of these clamping nuts 16a permits removal of the needlebed 1 from the frame.

The frame supports 10 and 11 permit the knitting machine to be attached against the edge of a table 18, shown in outline in Fig. 2, by turning the knobs 20 of the threaded rods 19 so as to clampingly engage the underside of the table. The rods 19 are received in the tapped holes 10a and 11a, which are drilled into the lower portions of the supports 10 and 11.

Figure 3:
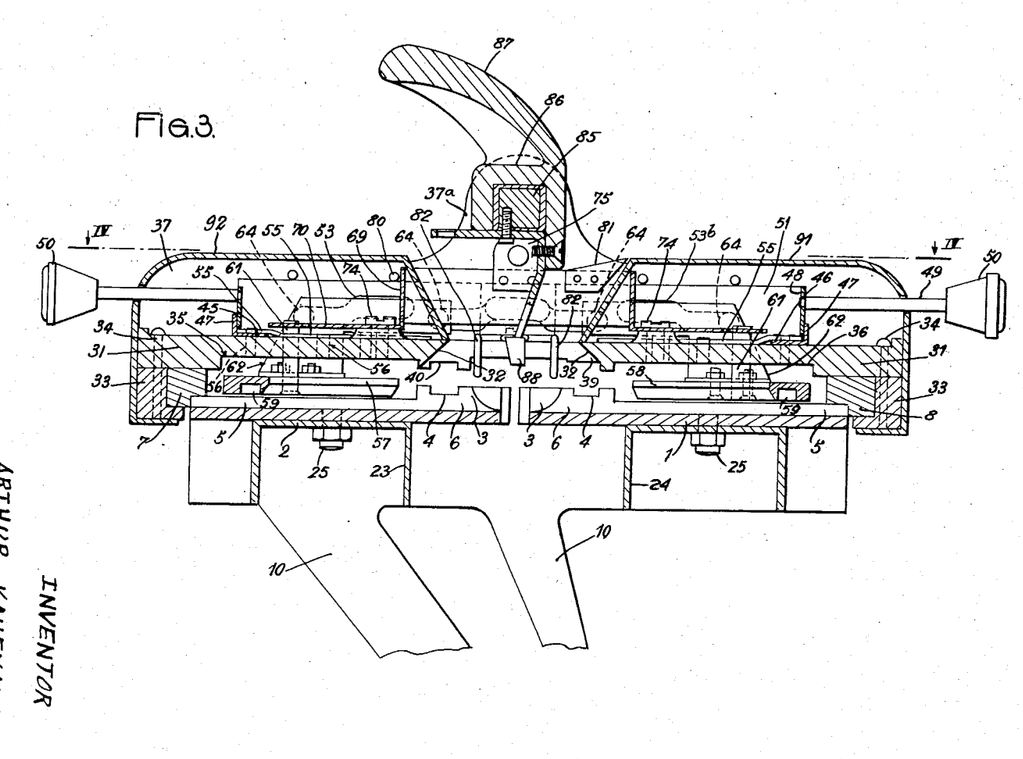
Figure 3 is an enlarged section taken on line III—III of Figure 1, and omitting a portion of the frame.

Holes 21 and 22 are drilled at the ends of the longitudinal groove 4 of needlebed 2, and two inverted channel stiffeners 23 and 24, Figs. 1 and 3, are secured by bolts 25 to the undersurface of the needlebeds 1 and 2. Guide studs 26 and 27 are carried by the crosspieces 13 and 14, respectively, Figs. 1 and 2, so that the needlebed 1 can be correctly centered with respect to the needlebed 2.

For operating the knitting machine, there is provided a carriage which supports most of the operating mechanism and is normally slidable, by hand, back and forth longitudinally of the described needlebeds. The carriage comprises a plate 31, Figs. 1 and 3, having a window 32 in its mid portion. A pair of L-shaped sections 33 attached to the plate 31 by screws 34 guide the plate 31 longitudinally of the needlebeds on the rails 7 and 8. The plate 31 is provided at its opposite ends with upstanding flanges 37 and 38, as best shown in Figs. 4 and 7, and each of the flanges 37 and 38, at its respective mid portion is provided with extensions 37a, 38a (Fig. 2) for support of a handle 87 to be later described.

Figure 6:
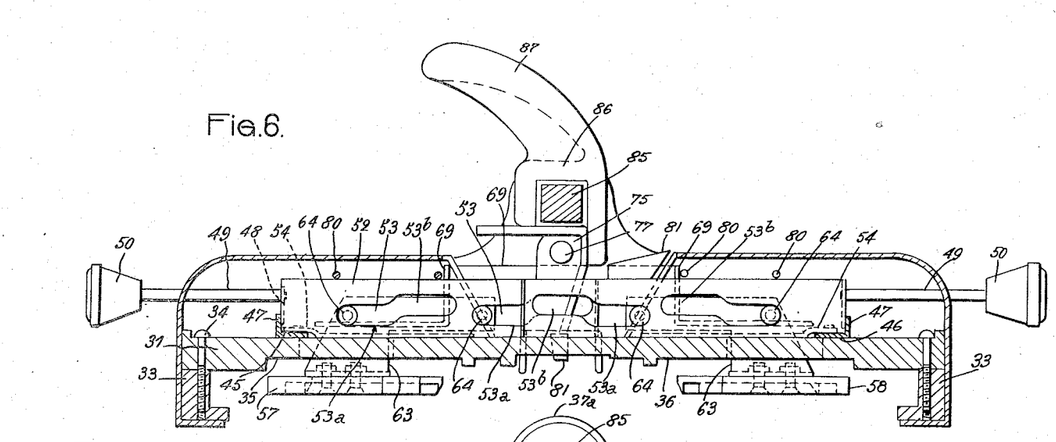
Figure 6 is a section taken on line VI—VI of Figure 4.
Figure 7:
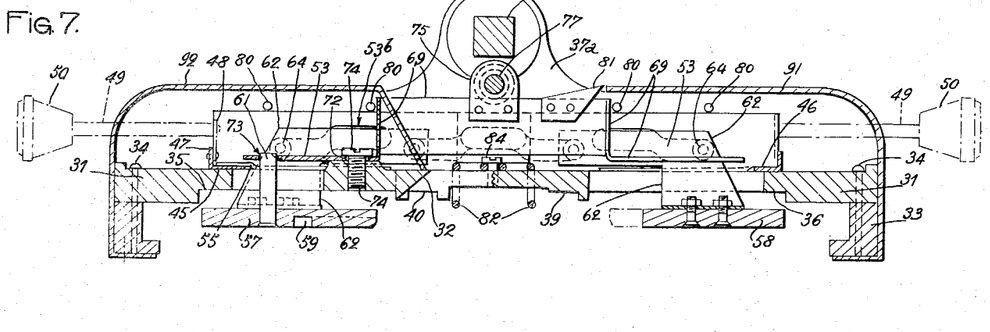
Figure 7 is a section taken on line VII—VII of Figure 4.
Figures 8, 9, 10:
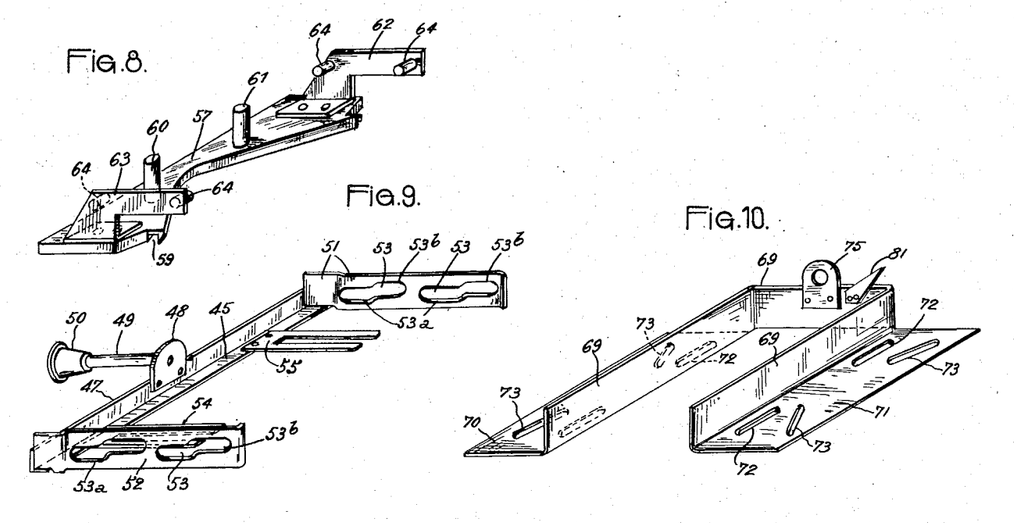
Figure 8 is a perspective view of one cam element of the knitting machine.
Figure 9 is a perspective view of one adjustable member for raising or lowering the cam element.
Figure 10 is a perspective view of a slide block which can be moved to adjust the spacing between cam elements.

A pair of slides 45 and 46, Figs. 6 and 7, rest on the plate 31 and each one, as shown in Fig. 9, comprises an L-shaped channel section 47 having a support 48 at the mid portion on which is secured a rod 49 with a control knob 50 and two side portions 51 and 52 in each of which is formed a pair of slotlike slideways 53. Each slideway 53 has two portions 53a and 53b offset relative to each other. Forks 54 and 55 extend from section 47 parallel to the side portions 51 and 52 for guidance by rivets 56 on the plate 31 during movement of slides 45 and 46.

Figure 4:
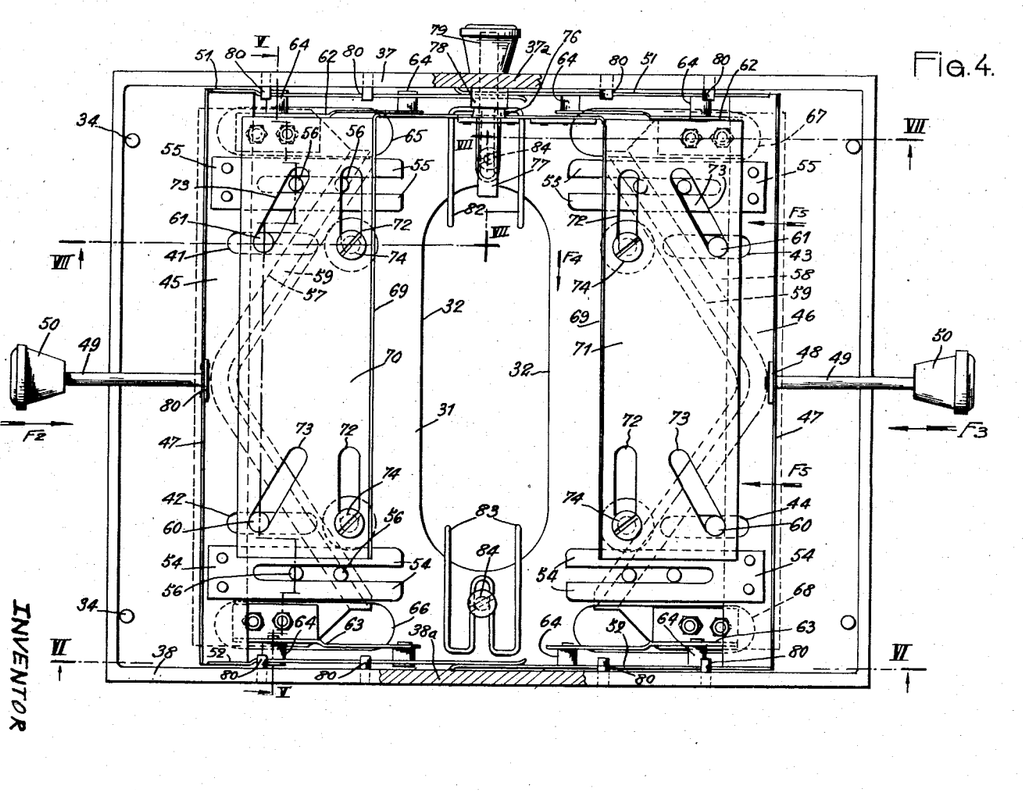
Figure 4 is a section taken on line IV—IV of Figure 3, the upper covers of the carriage removed and cutting through the seizing element.

A pair of cams 57 and 58, Figs. 4, 6 and 7, are mounted on the undersurface of the plate 31 and each cam, as best shown in Fig. 8, comprises a plate in which there is provided a V-shaped groove 59. The cams 57 and 58 are so positioned that the groove 59 in each cam is symmetrically disposed with respect to the longitudinal axis of the plate 31. The cam 57 comprises the vertical studs 60 and 61 which enter the slots 42 and 41 respectively of the plate 31, see Fig. 4, and the cam 58 is likewise provided with vertical studs 60 and 61 which enter the slots 44 and 43 respectively in the plate 31. This arrangement permits adjustment of the cams toward and away from each other.

Each of the cams 57 and 58 are provided with L-shaped arms 62 and 63 on which are mounted inwardly projecting studs 64. The L-shaped arms 62 and 63 on cam 57 enter windows 66 and 65, respectively, Fig. 4, and thus engage the plate 31, while the arms 62, 63 on cam 58 similarly pass through the plate windows 68 and 67. The studs 64 on arms 62 and 63 of cams 57 and 58 are received in the apertures 53 in the slides 45 and 46 by means of which they guide the cams to raised or lowered positions. This is permitted by cutout portions 35 and 36, Fig. 6, in the underside of plate 31 arranged symmetrically with respect to window 32.

Figure 5:
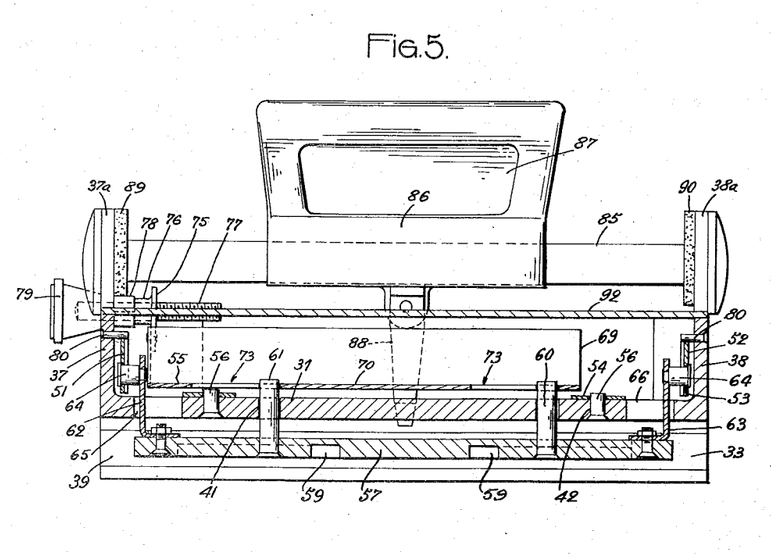
Figure 5 is a section taken on line V—V of Figure 4.

A U-shaped slide block 69, Fig. 10, is seated on the base plate 31 for sliding movement, Figs. 4 and 5. Slide block 69 has horizontal fins 70 and 71, each of which is pierced by a plurality of pairs of slots 72 and 73. Screws 74, Fig. 4, pass through the slots 72 into holes in the plate 31 to hold the slide block 69 on the plate 31 while allowing its displacement in a direction parallel to the window 32. The vertical studs 60 and 61 of the cams 57 and 58 pass through the slots 73 which are inclined with respect to slots 72. Thus, movement of the slide block 69 parallel to the window 32 and longitudinally of the needlebeds 1 and 2 will cause the cams 57 and 58 to move toward or away from each other. The slide block 69 is provided with an apertured lug 75 to receive the screw rod 77 and a nut 76, Figs. 2 and 4, fixedly secured to the lug 75, is threaded onto the rod 77. The threaded rod 77 freely rotates in the bearing 78 mounted on the flange 37 of the plate 31 and a control knob 79 on the outer end of the screw rod 77 controls the rotation thereof. It is therefore apparent that rotation of knob 79 will serve to change the spacing of the cams 57 and 58. Index 81 mounted on the slide block 69 serves to indicate this spacing as will be later more fully explained.

Stops 80, Fig. 4, are provided on the flanges 37 and 38 of the plate 31 to prevent vertical motion of the side portions 51 and 52 of the slides 45 and 46. A pair of needle latch actuators 82 and 83 are secured by screws 84 on the plate 31 near the ends of the window 32. A square section rail 85 is mounted on the extensions 37a and 38a of the flanges 37 and 38, and positioned above the longitudinal axis of the window 32. The rail 85 supports a slide block 86 which is provided with a control handle 87 at its upper portion and with an articulated yarn guide 88, Figs. 2 and 3, at its lower portion. Resilient pads 89 and 90 are positioned at the ends of the rail 85 for damping the shocks when the slide block 86 strikes the flange extension 37a or 38a at the ends of the rail 85. A pair of covers 91 and 92 protect the upper portion of the plate 31 as well as various elements which are supported by the plate 31. The plate 31 and the described elements associated therewith will be referred to as the "carriage" as the description of the invention later develops.

Figure 11:
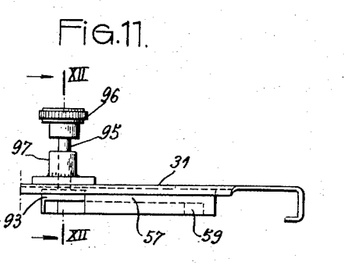
Figure 11 is an elevation of a modified cam element to which has been added a vertically adjustable small cam.
Figure 12:
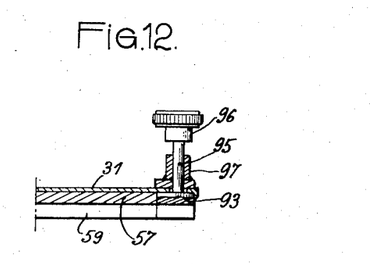
Figure 12 is a section taken on line XII—XII of Figure 11.
Figure 19:
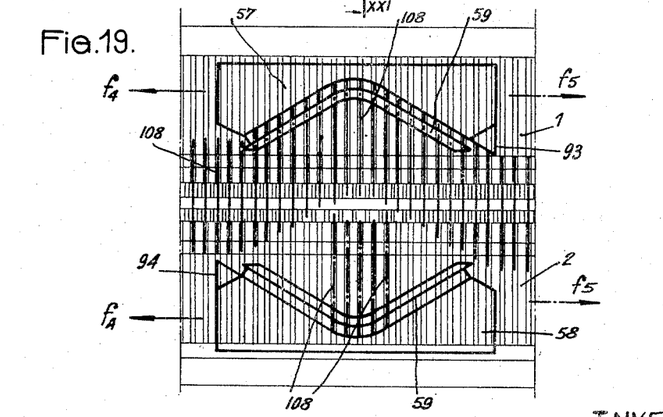

A pair of small cams 93 and 94 (Figs. 11, 12 and 19) are placed each at one end of the V-shaped grooves 59 on the cams 57 and 58 so that the V-shaped grooves may be extended. The cams 93 and 94 are mounted at one end of a rod 95, and a control knob 96 is mounted on the opposite end of the rod 95. The rods 95 are guided for vertical movement in apertured bosses 97 that are mounted on the plate 31. Cams 93 and 94, when in position to lengthen grooves 59, serve to move the needles from one needlebed to the other.

Figure 15:
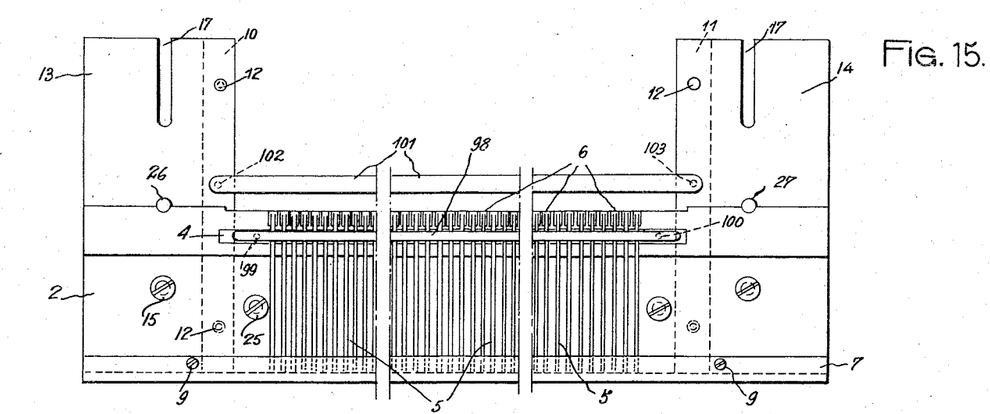
Figure 15 is a plan view of one needlebed set up for a particular type of work.

Upon removal of needlebed 1 from the frame, as previously described, a bar 98 is laid in the longitudinal slot 4 of needlebed 2, see Fig. 15. Bar 98 is provided with down-turned studs 99 and 100 which enter the holes 21 and 22 at the bottom of groove 4. A second bar 101, with studs 102 and 103, which enter the openings 30, Fig. 1, in the bottom of the cutouts 28 and 29 provided in the frame crosspieces 13 and 14, is laid parallel to bar 98. The bars 98 and 101 serve as guide rails for the carriage and needles, respectively, the former cooperating with the notches 39 or 40, Fig. 7, in the undersurface of plate 31.

Figure 16:
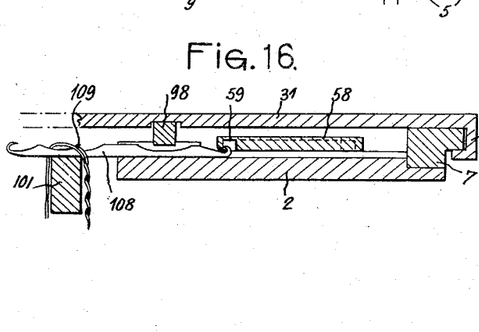
Figures 16, 17, 18 and 19 are diagrams illustrating mode of operation of the machine.
Figure 17:
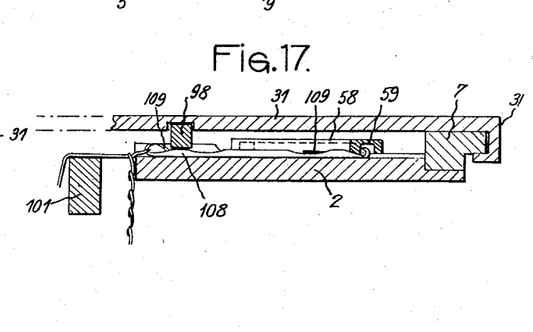
Figure 20:
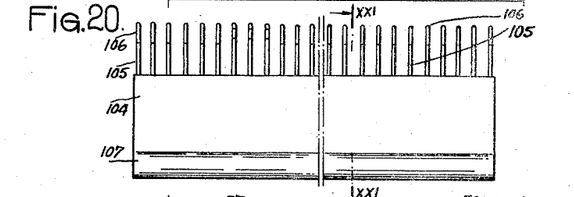
Figure 20 is a front elevation of the work holding comb used with the knitting machine.

The machine utilizes standard, double hook needles 108, Figs. 16 and 17, usually 5 guage which is the most common size for knitted clothing loops. Each needle carries latches 109. Preferably, a work comb is used such as that identified by numeral 104, Fig. 20. The comb embodies a plurality of spaced teeth 105 terminated in rings 106. A lead bar 107 is secured to the lower portion of the comb 104 to increase its weight.

Figure 21:
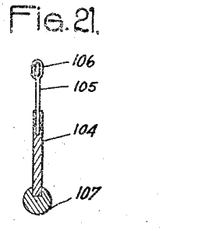
Figure 21 is a section taken on line XXI—XXI of Figure 20.

The knitting machine embodying the invention and described above is operated in the following manner:

When a piece is to be knitted, needles 108 are placed in the grooves 5, 6 of one needlebed 1 or 2, so that one hook of each needle lies over the work opening or space provided between the two needlebeds. A wool yarn is then passed through the rings 106 of the comb 104 (Figs. 20, 21) and into the hooks of the needles 108. The needles 108 are properly positioned in the space between the two needlebeds and with respect to the work by inserting the teeth of comb 104 in the spaces provided between the needles 108. The movable carriage, comprising the plate 31 and its various elements is moved to one end of the needlebeds. The knitting wool is then positioned in the movable yarn guide 88, and the knitting machine is ready to operate.

Figure 18:
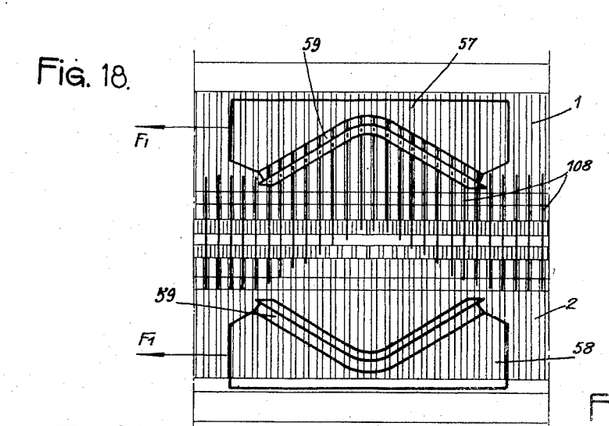

The described positioning of the needles will have centered them with respect to the front end of the outer edge of one of the V-shaped grooves 59 in cam 57 or 58 which are on the movable carriage. The latter is then displaced, for example, in the direction of the arrow F¹ (Figs. 1 and 18) by means of the control handle 87. The articulated yarn guide 88, sliding with handle 87, due to the motion effected for knitting, is moved towards and positioned at the end of the carriage in the direction of the displacement thereof. The displacement of the carriage engages the then non-knitting hook of each needle 108 in one of the V-shaped grooves 59 of the cams 57, 58; the needles are thus subjected to a rectilinear reciprocating motion causing the displacement of the row of knitting hooks which engage the wool yarn distributed by the movable yarn guide 88 in the previous loops, thus producing a new row of loops. The knitted work comes out between the two needlebeds 1, 2, pulled by the weight of the comb 104.

If it is desired to work on the two needlebeds simultaneously, both cams 57, 58 are lowered by pushing the control knob 50 for the rods 49 in the direction of the arrows F², F³ (Fig. 4). The effect of this motion is to push back the two slides 45, 46 so that the studs 64 associated with the cams 57, 58 occupy the positions in apertures 53 shown in Fig. 6. After having worked on one needlebed for one or more rows of loops, the needles are pushed on to the other needlebed by any suitable means. The needles then work on this new needlebed to make one or more rows of loops, when they are again sent back on the other needlebed, and this is repeated as often as necessary or desired.

When it is desired to use only one needlebed, one of the cams 57 or 58 is raised above the needles by pulling the control knob 50, controlling the cam in question in the opposite direction to the arrow F² or F³, Fig. 4, which displaces the slide of the cam in question and moves the studs 64 to the upper portion 53b of the apertures 53, Fig. 6. If a jamming of the needles occurs during operation, one of the cams is raised as described above to clear the jam.

The tightness of the loops in a work may also be adjusted by moving the cams 57, 58 closer to or further away from each other. This adjustment is effected by turning the control knob 79, which moves the slide block 69. When the slide block 69 moves in the direction of the arrow F⁴ (Fig. 4), the vertical studs 60, 61 and the cams 57 or 58 to which they are affixed move in the direction of the arrow F⁵ because these studs are cammed by the slots 73 placed obliquely on fins 70, 71 of the block 69. The spacing of the cams 57, 58 may be controlled with precision by means of graduations carried by the cover 91, against the index 81 on the slide block 69.

The latch actuators 82, 83 properly place the latches 109 (Figs. 16 and 17) of the needles 108 in their working positions at each passing of the carriage, thus preventing a missing of loops in the knitted work.

When it is desired to obtain a garter stitch work, it is necessary to use both cams 57, 58. The two small cams 93, 94 (Figs. 11, 12 and 19) are then engaged to extend the cam slot 59. In this case, the cam 57 which actuates the needles 108 when moving in the direction of the arrow $f_4$ (Fig. 19), at its trailing, right hand end, pushes these needles onto the needlebed 2. When the carriage moves in the direction of the arrow $f_5$, the needles are driven by the cam 58, whose forward end engages the hooks of the needles. The left hand end of the cam 58, extended by the small cam 94, pushes the needles onto the needlebed 1. Thus, in reciprocating the carriage, the needles are alternately shifted from one needlebed to the other.

When it is desired to make reductions in the number of loops in the knitted work, a number of needles are withdrawn and the corresponding loops are stopped. In some cases, it is necessary to operate the needles simultaneously on both needlebeds 1, 2. The needles are then placed so that some of them work under the action of the cam 57 while the others work under the action of the cam 58.

When it is desired to make certain stitches, of the Fair Isle pattern, for instance, in Jacquard pattern, it is necessary to use one needlebed only and one cam only. In such a case, the two clamping knobs 16a are loosened and the rods 16 associated with the needlebed 1 are allowed to slide along the cutout portions 17 to remove needlebed 1. Bars 101 and 98, Fig. 15, are then placed in position. The cam 57 is raised as much as possible so that the V-shaped groove 59 of this cam does not seize the hooks on needles 108. The preparation of the work and the operation of the machine are the same as previously described. The needles 108 rest, when they are in the position shown in Fig. 16, on the bar 101 and are guided between the bar 98 and the needlebed 2.

Although a certain specific embodiment of the invention has been shown and described, it is obvious that many modifications thereof are possible. The invention, therefore, is not to be restricted except insofar as is necessitated by the prior art and by the spirit of the appended claims.

I claim:

1. A knitting machine for home use comprising a frame, two needlebeds having transverse grooves and mounted on said frame in coplanar spaced relation, needles in said transverse grooves, a carriage slidably mounted on the outer edges of said needlebeds, a plurality of cams each having a widely open V-shaped groove on its lower face and mounted under the carriage for actuating said needles, a pair of supports on said sliding carriage, a rail carried by said supports and disposed longitudinally of the path of the carriage, a control handle slidable on said rail for driving the carriage, and a yarn guide mounted on and articulated under the handle.

2. A knitting machine according to claim 1 wherein one of said needlebeds is removable.

3. A knitting machine according to claim 1 wherein one of said needlebeds is removable, a bar placed longitudinally on said frame in the same plane as and parallel to the other needlebed, and a second bar placed longitudinally on said other needlebed.

4. A knitting machine as described in claim 1 wherein is additionally provided a pair of small extension cams which are vertically adjustable and detachably attached to said first named cams at longitudinally opposite ends of said V-shaped grooves.

5. A knitting machine as described in claim 1 comprising a pair of slides on said carriage, each slide having slideways, and studs slidably engaging said slideways and secured to said cams for vertical adjustment thereof.

6. A knitting machine according to claim 1 comprising a pair of slides on said carriage, each slide having slideways, studs slidably engaging said slideways and secured to said cams for vertical adjustment thereof, a slide block on said carriage having straight and inclined slots, and studs slidable in said straight and inclined slots and secured to said cams for adjustment of the spacing thereof.

7. A knitting machine according to claim 1 comprising a pair of slides on said carriage, each slide having slideways, studs on said cams slidably engaging said slideways, a slide block on said carriage having inclined slots, additional studs on said cams slidably engaging said inclined slots, a nut secured to the slide block, and a threaded rod screwed in said nut and associated with said carriage for longitudinally displacing the slide block and controlling the spacing of said cams.

8. A knitting machine as described in claim 1 comprising a pair of slides on said carriage, each slide having slideways, studs on said cams slidably engaging said slideways, a slide block on said carriage having inclined slots, additional studs on said cams slidably engaging said inclined slots, a nut on the slide block, a threaded rod screwed in said nut and associated with said carriage for displacing the slide block and controlling the spacing of said cams, and indexing means associated with the slide block and carriage for indicating said cam spacing.

9. A knitting machine according to claim 1 wherein said needles carry latches, and said sliding carriage is provided with needle latch actuators in its middle zone at opposite sides in the longitudinal direction of its path.

10. A knitting machine comprising a frame, a pair of needlebeds having transverse grooves mounted on said frame in coplanar spaced relation, needles in said grooves, a carriage slidable longitudinally along said needlebeds, a pair of cams on said carriage each having widely open V-shaped grooves for actuating said needles, a control handle for driving said carriage slidably mounted with respect to said carriage in the longitudinal direction of the path of the carriage and a yarn guide carried by said handle.

References Cited in the file of this patent

UNITED STATES PATENTS

| 49,980 | Clay | Sept. 19, 1865 |
| 53,013 | Langham | Mar. 6, 1866 |
| 523,820 | Stoll et al. | July 31, 1894 |